(12) United States Patent
Li (10) Patent No.: US 10,437,555 B2
(45) Date of Patent: *Oct. 8, 2019

(54) SYSTEMS AND METHODS FOR PRESENTING LOCATION RELATED INFORMATION

(71) Applicant: Chian Chiu Li, Fremont, CA (US)

(72) Inventor: Chian Chiu Li, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/723,082

(22) Filed: Oct. 2, 2017

(65) Prior Publication Data

US 2019/0050196 A1    Feb. 14, 2019

Related U.S. Application Data

(63) Continuation of application No. 15/674,525, filed on Aug. 11, 2017, now Pat. No. 9,811,315.

(51) Int. Cl.
| | |
|---|---|
| *G06F 3/16* | (2006.01) |
| *G06F 3/01* | (2006.01) |
| *H04M 1/725* | (2006.01) |
| *G06F 3/0487* | (2013.01) |
| *G06F 1/16* | (2006.01) |
| *G06Q 30/02* | (2012.01) |
| *H04W 4/02* | (2018.01) |
| *G06F 16/29* | (2019.01) |
| *H04L 29/08* | (2006.01) |

(52) U.S. Cl.
CPC ............ *G06F 3/167* (2013.01); *G06F 1/1694* (2013.01); *G06F 3/013* (2013.01); *G06F 3/017* (2013.01); *G06F 3/0487* (2013.01); *G06F 16/29* (2019.01); *G06Q 30/0267* (2013.01); *G06Q 30/0269* (2013.01); *H04M 1/72569* (2013.01); *H04W 4/02* (2013.01); *H04L 67/306* (2013.01); *H04M 2250/12* (2013.01); *H04M 2250/52* (2013.01); *H04M 2250/74* (2013.01); *H04W 4/026* (2013.01); *H04W 4/027* (2013.01)

(58) Field of Classification Search
CPC .. G06F 3/04842; G06F 3/04847; G06Q 10/00
USPC .......................................... 345/156; 704/275
See application file for complete search history.

(56) References Cited

U.S. PATENT DOCUMENTS

| | | | |
|---|---|---|---|
| 9,423,870 B2 | 8/2016 | Teller et al. | |
| 9,792,300 B2* | 10/2017 | Li | G06F 17/30241 |
| 9,811,315 B1* | 11/2017 | Li | G06F 3/167 |
| 2006/0136222 A1* | 6/2006 | Cross | H04M 3/4938 |
| | | | 704/275 |
| 2007/0024579 A1 | 2/2007 | Rosenberg | |
| 2014/0160434 A1* | 6/2014 | Brown, Jr. | A61B 3/113 |
| | | | 351/210 |
| 2014/0267034 A1* | 9/2014 | Krulce | G06F 3/013 |
| | | | 345/158 |
| 2014/0337740 A1 | 11/2014 | Kwon et al. | |
| 2014/0350942 A1* | 11/2014 | Kady | B60R 16/0231 |
| | | | 704/275 |
| 2015/0130716 A1 | 5/2015 | Sridharan et al. | |

(Continued)

*Primary Examiner* — Tony O Davis (57) ABSTRACT

Systems and methods for presenting location related information after a user arrives at a place. In an aspect, when a user gazes at a display of a standby device, information presentation begins. In other aspects, when a user shakes a device or says certain words to a device, and then gazes at it, a presentation starts.

12 Claims, 3 Drawing Sheets

(56) References Cited

U.S. PATENT DOCUMENTS

| | | | |
|---|---|---|---|
| 2015/0268719 A1* | 9/2015 | Li | G06F 3/013 |
| | | | 345/156 |
| 2016/0070344 A1* | 3/2016 | Gohl | G06F 3/013 |
| | | | 345/156 |
| 2016/0116978 A1* | 4/2016 | Li | G06F 3/013 |
| | | | 345/156 |
| 2016/0217794 A1 | 7/2016 | Imoto et al. | |
| 2017/0116223 A1* | 4/2017 | Li | G06F 17/30241 |
| 2017/0351367 A1 | 12/2017 | Popovich et al. | |

* cited by examiner

SYSTEMS AND METHODS FOR PRESENTING LOCATION RELATED INFORMATION

CROSS REFERENCE TO RELATED APPLICATION

This is a continuation of U.S. patent application Ser. No. 15/674,525, filed Aug. 11, 2017, which is a continuation-in-part of U.S. patent application Ser. No. 15/397,726, filed Jan. 3, 2017, which is a continuation-in-part of U.S. patent application Ser. No. 14/525,194, filed Oct. 27, 2014, now U.S. Pat. No. 9,619,022, granted Apr. 11, 2017.

FEDERALLY SPONSORED RESEARCH

Not applicable

SEQUENCE LISTING OR PROGRAM

Not applicable

BACKGROUND

Field of Invention

This invention relates to presenting information, more particularly to presenting information utilizing gaze detection.

Description of Prior Art

Many portable electronic devices have become ubiquitous, as an indispensible part of our daily life. Examples include smartphones, tablet computers, and potentially, smart watches or other wearable gadgets. These devices, especially smartphones, may be used to transmit to users and then present information such as advertisement prepared for consumers, notice and info for event attendees, class messages for students, or flight info for passengers. But many a time, it is not easy to acquire contact info of people involved and to figure out when to present. For instance, most ads are delivered to people indiscriminately, blindly, and without specific consideration on timing, which compromises the effectiveness of ads.

To make ads more relevant and acceptable, location-based advertising has been advocated. For instance, people visiting a store have a better chance to become a customer than people elsewhere. So a store manager may be more interested in sending ads to people present at the store than people at home. The same is true for delivery of information other than advertisements. For example, event attendees are more willing to read event material when they are in there, students are more likely to read class messages when at school, and passengers are more eager to learn flight and gate status when at the airport. Moreover, it's relatively straightforward to send location related information, since devices on the scene are the obvious target, and it may start sending messages right after users arrive at a location or come near a location. As a result, it's likely that the right info is sent to the right people in the right place at the right time. But then, the next issue may be how to present it in such a way that it is easy, simple, and convenient for a user to access. If relevant info is transmitted via email, a method used quite often nowadays, people may have to go through several steps to log in an email account, open a mail, and then take a look at it. If viewing info requires an app, people have to find the app among other apps installed at a device and then launch it. Either way, it is not convenient enough to look for info transmitted from a network or service to a device. On the other hand, if a device is on, and a window pops up by itself, it may become annoying; and if a device is in standby mode with a dark screen, it is inappropriate to lighten up its display to show any content without user consent. Thus presenting info on a device automatically has its own limitations.

Therefore, there exists a need to present location related information in a simple, easy, and convenient way.

OBJECTS AND ADVANTAGES

Accordingly, several main objects and advantages of the present invention are:

a). to provide improved methods and systems to present location related information at a device;
b). to provide such methods and systems which start a presentation when a user gazes at it;
c). to provide such methods and systems which start a presentation when a user shakes it and then gazes at it;
d). to provide such methods and systems which start a presentation when a user says certain words to it and then gazes at it;
e). to provide such methods and systems which sort location related information by device pointing direction; and
f). to provide such methods and systems which make info access easy, simple, and convenient.

Further objects and advantages will become apparent from a consideration of the drawings and ensuing description.

SUMMARY

In accordance with the present invention, methods and systems are proposed to present location related information. After a user arrives at a place, the user may just look at a device screen to start an info presentation by gaze. The user may also shake a device to trigger gaze detection, and then watch it to bring out a presentation by gaze. In addition, the user may speak to a device and then gaze at it to invoke a presentation. The method makes it easy and convenient for a user to get information. Moreover, information presented may be sorted by a device's pointing direction, which may reduce contents on a screen and make it easy to view.

| REFERENCE NUMERALS IN DRAWINGS | | | |
|---|---|---|---|
| 10 | Sensor | 12 | Device |
| 14 | Processor | 16 | Computer Readable Medium |

-continued

| REFERENCE NUMERALS IN DRAWINGS | | | |
|---|---|---|---|
| 18 | Sensor | 20 | Sensor |
| 22 | Sensor | 36 | Eye |
| 38 | Smartphone | | |
| 100, 102, 104, 106, 108, 110, 112, 114, 116, 118, 120, 122, 124, and 126 are exemplary steps. | | | |

DETAILED DESCRIPTION

Figure 1:
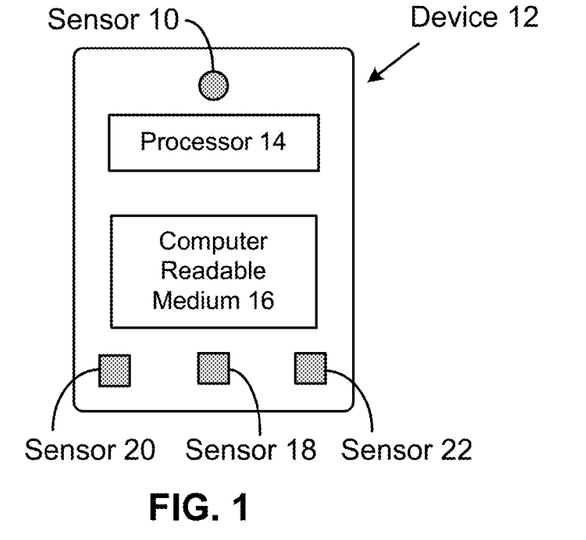
FIG. 1 is an exemplary block diagram describing one embodiment in accordance with the present invention.

FIG. 1 is an illustrative block diagram of one embodiment according to the present invention. A device 12 may represent an electronic device, including but not limited to mobile phone, smart phone, smart watch, wearable device, handheld computer, tablet computer, and the like. Device 12 may include a processor 14 and computer readable medium 16. Processor 14 may mean one or more processor chips or systems. Medium 16 may include a memory hierarchy built by one or more memory chips or storage modules like RAM, ROM, FLASH, magnetic, optical and/or thermal storage devices. Processor 14 may run programs or sets of executable instructions stored in medium 16 for performing various functions and tasks, e.g., surfing on the Internet, playing video or music, gaming, electronic payment, social networking, sending and receiving emails, messages, files, and data, executing other applications, etc. Device 12 may also include input, output, and communication components, which may be individual modules or integrated with processor 14. The communication components may connect the device to another device or a communication network. Usually, Device 12 may have a display (not shown in FIG. 1 for brevity reason) and a graphical user interface (GUI). A display may have liquid crystal display (LCD) screen, organic light emitting diode (OLED) screen (including active matrix OLED (AMOLED) screen), or LED screen. A screen surface may be sensitive to touches, i.e., sensitive to haptic and/or tactile contact with a user, especially in the case of smart phone, smart watch, and tablet computer. A touch screen may be used as a convenient tool for a user to enter input and interact with a system. Furthermore, device 12 may also have a voice recognition component for receiving verbal command or audio input from a user.

A communication network which device 12 may be connected to may cover a range of entities such as the Internet or the World Wide Web, a local area network (LAN), a wide area network (WAN), a metropolitan area network (MAN), a telephone network, an intranet, wireless, and other types of networks. Device 12 may be connected to a network by various wired, wireless, optical, infrared, ultrasonic or other communication means.

Device 12 may also include a sensor 10 which tracks the eye movement or gazing direction of a user using mature eye-tracking or gaze detection technologies. The sensor may be arranged on the top surface of a device, or close to a display screen, and may be designed to have imaging capability. With imaging functions, a system may recognize whether an eye is in such a state that the eye sight falls on the body of device 12 using certain algorithm, in other words, sensor 10 may be employed to determine whether a user is looking at the body or the screen of a device. Once it senses that a user is gazing or looking at a given target, it may record the starting time, and then the total gazing or watching time. Only when the gazing or watching time exceeds certain value, for instance a few seconds, it may be declared that a user is gazing or looking at a target. As a consequence, a very brief look may be too short to qualify as a gazing or watching act. In the following sections, it is assumed the total gazing time of each case satisfies a minimum value requirement when it is said a gazing act is detected.

Sensor 10 may be built using mature imaging technologies, such as technologies for making camera modules which are used in almost every smartphone, and an image of user's eye may be analyzed with mature algorithm to decide which direction the user is looking at. Both visible and infrared light may be employed for eye tracking. In the latter case, an infrared light source may be arranged to provide a probing beam. In addition, sensor 10 may also employ other suitable technologies which are capable and affordable other than the eye-analysis scheme discussed to determine a gazing or watching direction of a user. In some applications, when the accuracy of gazing direction is not critical, such as when a gaze target is a screen, not a small area of the screen, a watching direction may be obtained via analyzing facial pictures of a user.

Device 12 may also include a sensor 20 which functions as a proximity detector, which is well known in the art and well developed too. Sensor 20 may be used to detect an object outside the device and may have multiple sensing units. It may include a camera-like system to obtain visible images or infrared images and then recognize any movement through image analysis over a period of time. It may also have capability to sense whether device 12 is close to a user's body or whether it is held by a hand. Detection result may be used to determine an environment where a user is in, or the intention of a user. For instance, a user may want to look at a device anytime when he is holding it on hand.

Moreover, device 12 may contain a sensor 18 to detect its own movement by sensing acceleration, deceleration, and rotation, which may be measured by accelerometers and gyroscopes. Accelerometers and gyroscopes are already mass produced using semiconductor technologies. They are widely used in smartphones and other personal gadgets. Using measurement data obtained by sensor 18, it can be determined whether device 12 is moved to the left, right, forward, or backward, and at what speed, whether it is rotated clockwise or anticlockwise along which axis, and whether it is tilted to the left, right, forward, or backward. The data may also be used to detect whether a device is moved back and forth as a result of shaking. In some embodiments in the following, device shaking, as a user input, is one state to be detected. Word "shake" or "shaking" may be interpreted here as moving a device horizontally or vertically, rotating along any axis, or any other patterns of back and forth movement. Furthermore, sensor 18 may be used to detect vibration of device 12. Thus, knocking or tapping on a device body may be utilized as a user input too, because it generates detectable vibration signals.

Inside device 12, output signals of sensors and detectors are transmitted to processor 14, which, employed with certain algorithm, may process the data and produce subsequent command instructions according to certain programs or applications. The instructions may include presenting location related info on a screen.

In addition, device 12 may carry a positioning sensor (not shown in FIG. 1 for brevity) and a magnetic sensor 22 as an electronic compass. A positioning sensor may be a global positioning system (GPS), which enables a device to get its own location info. Device position may also be obtained using wireless triangulation methods, or a system employing other suitable technologies, while both may be performed by a service provider or service facility. Sensor 22 measures the earth magnetic field along least two orthogonal axes X and Y. It may be used to determine device orientation, such as which direction a device is pointing at, assuming the device is placed in a horizontal or vertical position. When a device's location is known, service center may send to the device location-based information, i.e., info related to the location or nearby places. In the case of location-based advertising, a user may receive commercials after he or she is at a business or close to a business. On the other hand, when the pointing direction of device is known, space around a user may be divided into sections. With the knowledge of a device's location and pointing direction, a segment of map area which corresponds to where a device is pointing at may be generated. The segment may match a user's interest, and thus information from this segment may be more relevant than info from other areas. Meanwhile, sorting by segment may make information easier to view for users, since contents presented on screen are reduced.

Figure 2:
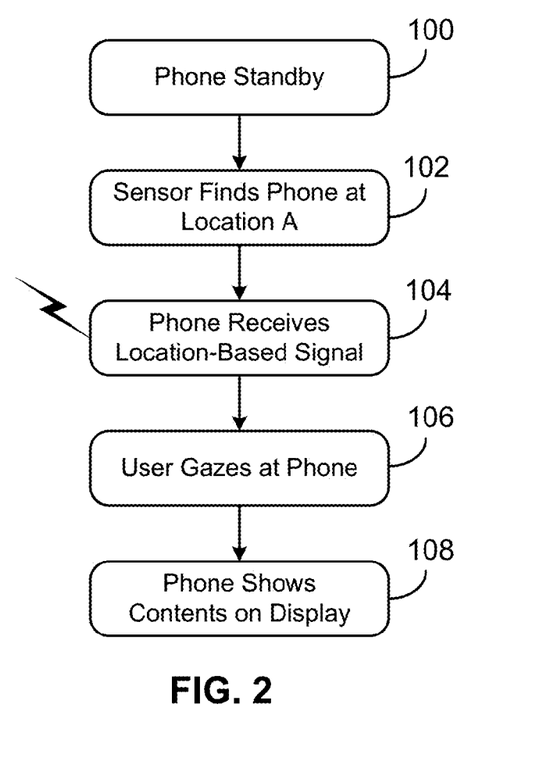
FIG. 2 is an exemplary flow diagram showing one embodiment of presenting location related information in accordance with the present invention.

FIG. 2 is a schematic flow diagram showing one embodiment of presenting location related information. Take smartphone for example. Assume a smartphone is in standby mode in Step 100. When a user with the phone enters Location A, a system sensor may detect it in Step 102. For instance, when a phone arrives at a place, a service provider may sense it or a local sensor may detect it using mature positioning technologies. Assume there is information available which is related to Location A. In Step 104, a location-based signal is transmitted to the phone and the phone receives it. The signal may come from a remote center or a nearby facility. Once the phone gets the signal, it starts sensing the user's gaze direction. When not triggered, gaze detection function may be in off state to conserve power. In Step 106, the user gazes at the phone screen, which may be sensed by a gaze sensor like sensor 10 of FIG. 1. Here a user's gaze act may work as the user's approval for presenting information. In Step 108, the phone displays contents related to Location A.

After arriving at a location, a user may become more likely to view information related to the place. The user just needs to look at a phone screen, info would appear automatically. The info presentation process is easy, simple and convenient. It may be used by teachers to distribute class notes, which may be accessed by students at one classroom only, by store manager to send advertisement to people at or close to his or her store only, or by organizer to send on-site event participants info on the event. Usually for indoor or some urban environment, positioning methods other than GPS are used, since GPS requires a clear view of the sky or clear line of sight for four GPS satellites.

The scheme described in FIG. 2 provides a simple and practical way to arrange location related information. But when lot of such information is available, it makes things a little complicated. For instance, in a shopping mall area, there may be many stores and shops around. As a consequence, a user may find it time consuming to get needed info. Thus a quick and convenient sorting method is desirable. For this issue, following discussion gives a solution.

Figure 3:
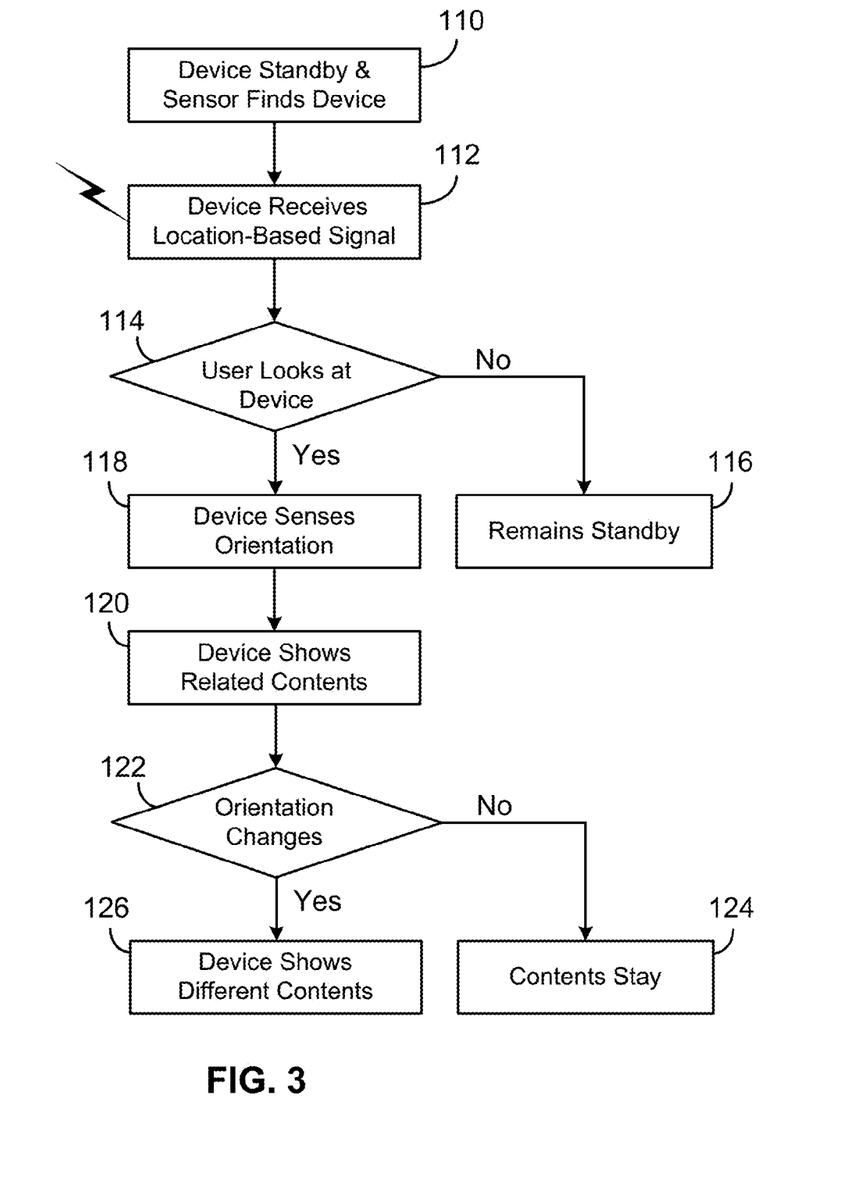
FIG. 3 is an exemplary flow diagram showing another embodiment of presenting location-based information in accordance with the present invention.

FIG. 3 shows another schematic flow diagram of presenting location related information. Assume a device is on standby and is detected at a place in Step 110. Next in Step 112, the device receives a signal which contains location related information through wireless technologies. Then, a gaze sensor is activated and begins to sense the gaze direction of a user. The gaze sensor may be arranged always on if power conservation is not an issue and the user consents. In Step 114, the gaze sensor detects whether the user looks at the device. If the user looks elsewhere, the device may remain its standby state in Step 116. When the user ends the standby state later on, a temporary icon may appear on screen. The icon may represent information related to the location. Once the icon is tapped or clicked, location related info may be presented. A temporary icon may also be generated on screen for later use when a user is busy engaging with an app at the moment of receiving location related information. Such icon provides another opportunity to present temporarily stored location related contents. Back to the figure, if it is detected that the user looks at the device for a given period of time, the device may start to detect its orientation using a magnetometer component like sensor 22 of FIG. 1, as shown in Step 118. In the meantime, the device may acquire its position status, i.e., its location. Location data may be obtained via the device's own sensor or an outside sensing system. Once info of location and orientation is known, the device may start presentation of related information in Step 120. The related information is of info associated with the pointing direction of the device. For instance, with the knowledge of location and orientation and certain algorithm, a device may provide a list of businesses which are located between its place and somewhere far away along its pointing direction. The list of businesses may be in a text format or shown on a map segment. A map segment is part of a map with an elongated shape along a device pointing direction. A map segment may be obtained by cutting off some parts of a map and leaving only an elongated segment. Thus a pointing act may be used as a sorting tool, and a device may be designed to show information related to or around a pointing direction only. Besides businesses and organizational entities, pointing direction of a device may also be used to get info of products. For instance, a user may point a device at one section of a store to get prearranged info of that area, such as coupons and items on sale in that direction.

A device may be in a horizontal position, or vertical position. Take smartphone for instance. If a phone is in horizontal position, with its display screen being horizontal and parallel to the ground, a pointing direction is what its front end points outwards in a horizontal plane. For a phone in vertical position, a pointing direction is what its back points at or its camera points at, which is the opposite direction of what its screen faces.

As orientation data may be obtained fast through an electronic compass, a pointing act may lead to real-time info scanning. In Step 122, device orientation is measured again. If there is no change, contents on display may remain in Step 124. If there is a change, meaning the device is rotated to point at a new direction, another set of contents may be presented in response in Step 126. For example, when a user rotates a smartphone horizontally along a vertical axis, it may work like scanning with a probing beam. It may be designed such that during scanning, only information related to a business which is straight ahead will show up on screen. Thus a user may slowly rotate a device, like a smartphone, to view info at each direction, or point a device at a selected business to access info of that business directly.

Figure 4:
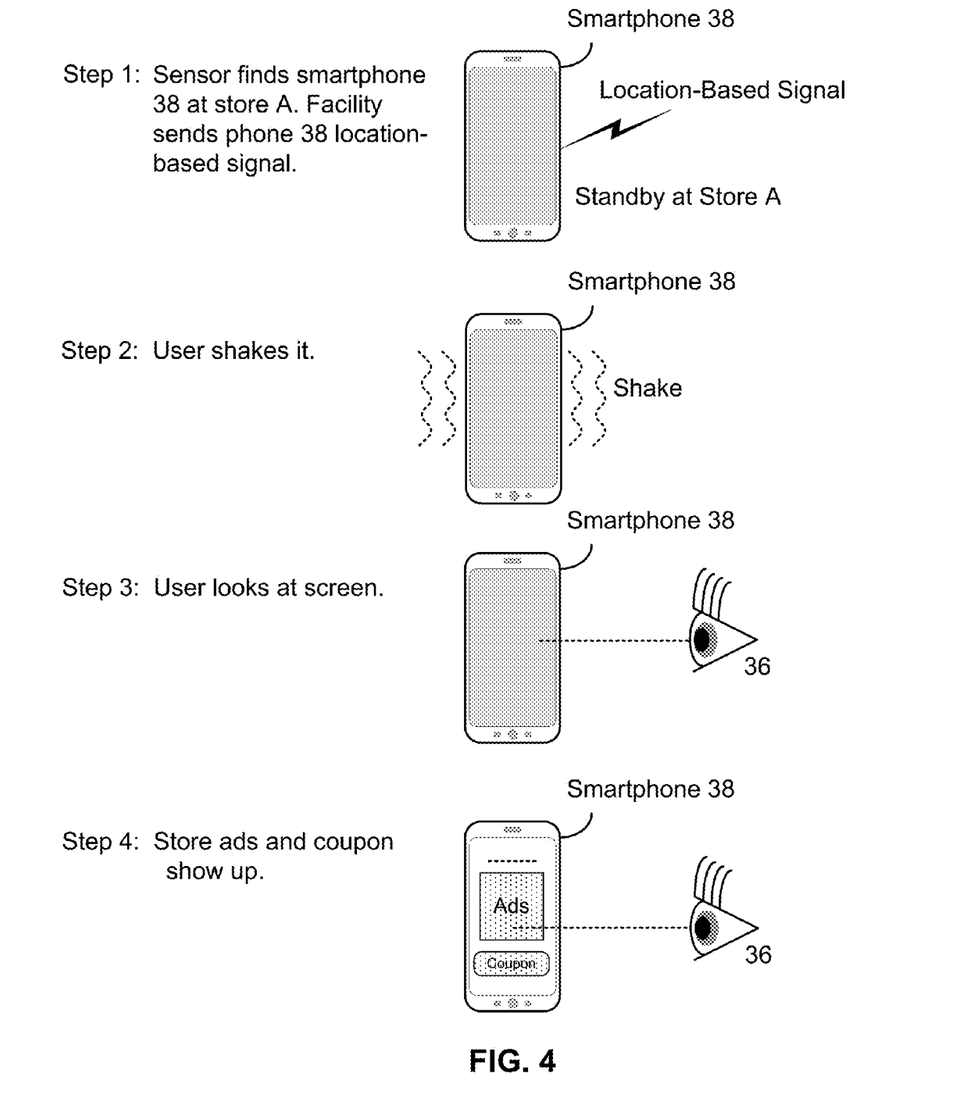
FIG. 4 uses graphic diagrams to show yet another embodiment of information presentation in accordance with the present invention.

FIG. 4 uses graphic diagrams to show another embodiment of presenting location related information. Again, a smartphone is used in a retail setting. It starts with Step 1 when a positioning sensor finds a smartphone 38 at store A. The phone is in standby mode and has a dark screen. A service facility sends the phone a signal, and the phone receives location related information. Unlike the previous embodiment, a gaze sensor of the device is not triggered by the location-based signal, but by a user's physical act like shaking or tapping the device. In Step 2, the user shakes phone 38, which is picked up by the phone immediately, e.g., within seconds. Then the control system of phone 38, like processor 14 of FIG. 1, sends a signal to the gaze sensor. The gaze sensor starts sensing the user to determine whether he or she looks at the phone screen. If it is detected that eye 36 is watching the phone screen for a predetermined period of time in Step 3, the device may begin presenting store advertisements and coupons in Step 4.

In above discussions, a user needs to do two things, shaking a phone lightly and watching its screen briefly, and then certain info will be displayed. The scheme brings several merits. A user may have more control over what time to show location related information. It may reduce chances of showing unwanted info by an accidental gaze at a device. In addition, as a shaking act reflects a user's desire for certain content, it may help satisfy the user and help content owner like merchants in the meantime.

Furthermore, a user may speak to a device to turn on a gaze sensor using voice recognition techniques. For instance, a user may say to a device "Start" and then look at it to invoke a presentation. Benefits of using gaze detection and voice recognition together include precision, convenience, multiple choices, and complex instructions. Without gaze detection, multiple devices may react to a voice command and cause confusion. Without voice recognition, gazing may invoke a single and often simple task only, which may limit applications.

When voice recognition and gaze detection are used together, two scenarios may be created: A user may say certain word or words and then look at a device or look at a device and then say certain word or words. The two actions, i.e., speaking and gazing, in both scenarios may be arranged to cause a device to carry out one or more tasks. As aforementioned, when it is detected that a user looks at or gazes at a device, it means the user looks at or gazes at it for at least a given time. The tasks may include presenting certain contents, turning on a device from a standby or power-off state, switching from one working state to another one, implementing one or more tasks specified in a voice input, and performing other given tasks. For brevity purpose, only one or two tasks are cited when discussing voice-related examples below, where other tasks may be applied without mentioning. Contents presented using or at a device may be related to a location, scheduled by a user, arranged by a remote facility or service center, or specified in a voice input. The contents may have video, audio, or other format and may be subscribed with fees or sponsored by an entity. A device may present contents using a display, a speaker, or other output components. Initially, the device may be at a standby, sleeping, power-off, or power-on state. In some applications, whether or not a user gazes at a device may be detected. In other applications, whether or not a user gazes at a device's display, speaker, oran other output component may be detected. For brevity reasons, only the former case, i.e., gazing at a device, is mentioned in discussions below.

In the first scenario, a voice recognition system is on and monitoring a user's voice message from the beginning. For instance, the system may be arranged in an operational mode to collect and analyze a user's voice message continuously. After the system receives a voice input, it analyzes and interprets the input using certain algorithm and ascertains whether the input matches or contains one of prearranged voice commands. A single word or sentence such as "Start", "Turn on", a program name, or a device name may mean a command to start a presentation or turn on a device. Once it is detected that a user issues a voice command, the user's gaze direction is checked. A gaze sensor may be in a working state all the time. Alternatively, the gaze sensor may also be triggered to wake up from a sleeping or standby state by a signal which may be triggered by the voice recognition system after the system receives an input. When it is concluded that a user gazes at a device within a given short time period, like five to ten seconds, after a voice command is received, the command is implemented at the device. If a device cannot ascertain that a user gazes at it, the device may ignore a voice command which it received a short while ago. The gaze requirement enables targeting a device with precision, which may be especially useful when multiple devices which all have voice recognition capabilities are present.

In the second scenario, a gaze sensor is on and monitors a user's gaze direction continuously. A voice recognition system may remain active and ready to take a voice input all the time. As another option, a voice recognition system may be on standby and only wake up when a gazing act happens. For instance, after it is detected that a user gazes at a direction towards a device, a signal may be generated to turn on a voice recognition system at the device and optionally, the device may turn on a lighted sign with a word like "Ready". The sign may work as an invitation to ask for voice instructions from a user. As long as a user looks at the device, the sign may stay lighted there. When it is determined that a user gives a voice command while still looking at the device or within a given time period, say five to ten seconds, after the user finishes a gazing act, the voice command is carried out at the device. If a user gives a voice command without looking at a corresponding device, the voice command may not take effect. Again, gazing and voice command are used together to target a device with precision and initiate a task at the device.

When both a gaze sensor and a voice recognition system are turned on from the beginning, a method may be arranged where either a gazing act or a voice input act may happen first. For instance, it may be configured that if a user says a command and then gazes at a device within a given time, the command may be implemented at the device; if a user says a command and gazes a device at the same time, the command may be implemented at the device; if a user gazes at a device and then says a command while still gazing at the device, the command may be implemented at the device; and if a user gazes at a device and then says a command within a given time after the gazing act ends, the command may be implemented at the device. In other words, assume that a user gazes at a device during a first time period from time-A1 to time-A2 and issues a voice command during a second time period from time-B1 to time-B2. The device may be arranged to implement the command if the two time periods overlap either fully or partially or a gap value between the two time periods along a timeline is smaller than a given value, say five to ten seconds, where it doesn't matter which period happens first. For instance, when time-B1 is later than time-A1 and time-B2 is earlier than time-A2, the two time periods overlap fully. When time-B1 is later than time-A1 but earlier than time-A2 and time-B2 is later than time-A2, the time periods overlap partially. When the two time periods don't overlap, time interval between time-A2 and time-B1 or between time time-B2 and time-A1 is the gap value. It is seen that above descriptions using time periods apply to cases where a gaze sensor or voice recognition system is triggered by a user's verbal or gazing action.

When multiple devices are involved, two methods may be designed. Assume that a user gazes at a first device before issuing a voice command and gazes at a last device immediately after the voice command is issued. Meanwhile, the user may gazes at any device or devices when the user is issuing the command verbally. Then it may be configured that either the first device or the last device may dominate. With the first method, the command may be performed at the first device, regardless of what happens afterwards. With the second method, the command may be carried out at the last device regardless of what happens before.

In above discussions, it is assumed that a device contains a gaze sensor, a voice recognition system, and a presentation component like a display or a speaker. Alternatively, a device may only contain a presentation component and perform presentation function, while gaze sensing and voice recognition may be controlled by a separate on-site or remote control system. For instance, a control system of a museum may monitor a visitor's gaze direction and verbal instructions using gazing and voice sensors. The control system may detect whether the visitor looks at a wall-mount display and says "Open" simultaneously or within a given time period starting from end of the gazing act, or says "Open" and looks at the display simultaneously or within a given time period starting from end of the voice input submission. For instance, the control system may receive and analyze data from the sensors, ascertain a visitor's gaze direction, identify the wall-mount display by the gaze direction, receive a voice input from the visitor, recognize a command from the input by certain algorithm, determine time periods corresponding to the gazing and verbal acts respectively, proceed when the two periods overlap or a gap between the two periods is smaller than a given value, generate a signal, and send out the signal which may cause the display to turn on and show certain contents accordingly.

A device may also have a locating detector to identify a user and measure position of the user who has just generated verbal contents. A locating detector may measure and analyze sound waves to determine a source position using mature technologies. The locating detector may also be used to collect voice inputs from a target user only, where the target user may have gazed at a device or may be gazing at the device. Locating a target user becomes critical when multiple users are on site. For instance, a device may be configured to receive and interpret a voice input, identify and locate a user who just gives the voice input using a locating detector, measure the user's gazing direction, and then perform a task extracted from the voice input when the user gazes at the device simultaneously or within a given time period after the voice input is received. Alternatively, a device may also be configured to monitor a user's gaze direction, measure and obtain position data of the user after the user gazes at the device, calculate a target position of sound source of the user, e.g., a position of the user's head or mouth, receive a voice input, ascertain whether the input comes from the target position, analyze the input if it is from the target position, ascertain whether the input contains a command, and then perform a task derived from the command when the input is received while the user is still gazing at the device or within a given time period after end of the gazing act.

It is noted that a user may generate a voice input which may include various simple or complex commands. A simple command may contain a single and simple word to describe a simple task, such as "Start", "Open", or "TV", which may be used to cause a device to start working, like turning on a radio, an air conditioning, or television. A user may also issue a complex command which may contain several sentences to describe one or more tasks having several requirements. For instance a user may say to a control device "Turn on air conditioning, turn on TV, go to Channel Nine," while looking at it.

Since a device may be targeted precisely with mature voice recognition techniques, gaze sensing may not be needed in some cases. For instance, a name may be assigned to a device. When a user says the name and a command, the device may detect its name and take the command. But relying solely on a device name in a voice command has weaknesses. For instance, a user has to remember a name, which has to be unique to avoid duplicating another name. A user has to say the name, which means an extra requirement and extra step. And a user may say a wrong name, which may cause frustration since a command may not be carried out. Thus there exists a need for a method which combines gaze sensing and voice recognition via a new scheme.

When a name is assigned to a device, a voice command may be taken from a user and implemented at the device in several cases. For instance, a device may monitor a user's gaze direction and voice input and carried out a command when one of the conditions or requirements is satisfied without using name of the device. The conditions or requirements may be those which are discussed in the above, e.g., when a gazing and verbal acts occur together. A device may also be configured to recognize its name from a voice input and implement a command without checking gaze direction. For instance, assume that a device is assigned a name "ABW". The device's voice recognition sensor is on. After a user says "ABW, turn on the lights", the device may take the input, recognize its name and the command, and then create a signal to turn on the lights, which is a task derived from the command. But if a wrong name is used, the device may not follow the command. A device may implement a command even when a user says a wrong name if it relies on results of gaze detection. For instance, assume a user says to the device "YW, turn on the lights" while looking at it. If voice recognition is used alone, the device may not react, as the command is addressed to another device. However, with gaze detection, it may be configured that as long as a user gazes at a device while speaking to it, or a user's gazing and verbal acts satisfy one of the conditions or requirements, a command may be implemented even when the user says a wrong name.

To make it more flexible, three options may be provided to a user at the same time: A user may gaze at a device and say a command without mentioning a device name; a user may say a command and mention a correct device name without gazing at it; and a user may gaze at a device, say a command, and mention a device name. The first option represents all cases as discussed where a device name is not involved. The second option may not work if a wrong name is used. The third option is like the first option plus that a user says a device name. In the third option, whether or not a user mentions a correct name becomes irrelevant, since the device is identified by detected gazing direction, not the device name. Therefore, a user may choose to gaze at a device or not to gaze at it, when issuing a voice command to the device. And to be certain, a user may choose to gaze at a device when submitting a voice command.

Accordingly, a device may be configured for a user to use with any of the three options. For instance, a device may keep monitoring a user's voice input and gaze direction via a voice recognition system and a gaze sensor, and ascertain whether a voice input contains a command and whether the user gazes at the device. If the device doesn't detect any command from the user, no task is implemented. If the device detects a voice command, it may ascertain whether a qualified gazing act happens and whether a device name is mentioned which matches a predetermined name or profile. A qualified gazing act may be the one which when combined with the verbal act satisfies one of aforementioned conditions or requirements. If a qualified gazing act is detected, the device starts implementing the command. If a qualified gazing act is not detected, but a correct device name is mentioned, the device starts implementing the command. If a qualified gazing act is not detected, and a correct device name is not mentioned, the device doesn't implement the command.

When multiple devices are involved, an on-site or remote control system may be arranged. The control system may receive, collect, and analyze data sent from gaze sensors and voice sensing detectors of the devices. A voice sensing detector may be designed to detect sound waves. The gaze sensors and voice sensing detectors may be arranged to sense a user continuously. The control system may work in three modes. In the first mode, the control system may carry out a command at a device which a user gazes at and a condition set forth for gazing and verbal acts is met. In the second mode, the control system may carry out a command at a device whose name is mentioned by a user in the command. In the third mode, the control system may carry out a command at a first device which is gazed at by a user or mentioned in the command. When a user gazes at the first device and mentions a name of a second device, the control system may carry out the command either at the first device or the second device depending on set-up selection. It may be arranged that a user may choose a mode or switch from a mode to another one.

CONCLUSION, RAMIFICATIONS, AND SCOPE

Thus it can be seen that systems and methods are introduced to present location related information.

The improved method and system have the following features and advantages:
(1). Location related info may be brought out by simply gazing at a screen;
(2). Gaze sensor of a device may be turned on by a location-based signal or shaking act of a user;
(3). Gaze detection and voice recognition may be used together, where a device may be chosen by a user's gazing act and multiple tasks may be arranged for selection via voice instructions;
(4). Information may be sorted and selected by pointing direction of a device.

Although the description above contains many specificities, these should not be construed as limiting the scope of the invention but as merely providing illustrations of some of the presently preferred embodiments. Numerous modifications will be obvious to those skilled in the art.
Ramifications:

Ambient light sensor may be added to a device which may be used to sense ambient light intensity to determine whether the device is in a pocket or bag. If a device is not pulled out, act of shaking, tapping or knocking may be ignored in applications discussed in the above.

Furthermore, a device may be equipped with facial recognition system. The system may at least recognize a device owner, which may protect user privacy by not following other people's instructions. The system may make use of eye-tracking camera and employ facial sensing algorithm to identify a user.

In several examples in the above, shaking is used to illustrate various embodiments. It is noted that other forms of user input, such as rotating, tilting, tapping, knocking, or touching may also be employed to perform the same function. Still other methods for a user to interact with a device besides shaking include sliding on a touch screen or touch pad, or opening a lid of a device.

If a user's identity is known, info presented may be selected based on not only the location of the user, but also his or her past experience, or based on a user's experience only when it is worthwhile to do so. For instance, when a user is travelling, he or she may have more free time, which provides a good chance for presenting certain info, like commercials. Although advertisement presented may be unrelated to a location, since it may fit the interest or need of the user, it may be relevant, and thus effective. Thus, contents presented on a device after the device is waked up from a standby state may be location related or arranged at a remote or nearby facility according to a user's records and analysis on the user.

In addition, it may be arranged such that a user may decide what to present on screen. For instance, a user may choose a program for update on news, instant messages, or a social networking group. When there isn't any suitable location related info or other prearranged info from a service, a device may display contents preselected by a user after the device received a signal and appropriate user input. Options may also be configured such that a user may select either to present location related info prepared by a service or present certain info or program prearranged by a user. In practice, buttons "Location-Related Info" and "Self-Selection" may be configured on screen during a presentation period. The buttons may correspond to presentation of location-based info and self-selected info respectively. A user may switch between showing different information by tapping or clicking on the buttons.

Thus, a gazing act may be used to display info which is related to a user's location, records, or self-selection. It is noted that info on display or to be displayed may be any which is arranged by a system, a service, or a user, or may be any which is not related to contents shown on screen before a device got into a standby mode. In other words, it may be arranged such that a gazing act or shaking plus gazing act causes presentation of contents which are specifically arranged and are unrelated to information presented before standby state.

The schemes illustrated in FIGS. 2, 3, and 4 may be combined in many ways. For example, sorting info by pointing function may be applied to all cases. On-screen buttons may be arranged for turning on and off the sorting function. So a user may choose options to turn on or off sorting mode any time.

For convenience and better user experience, after a user arrives at a place and the user's device receives location related data, the device may beep to signal that some info is available to watch. Meanwhile, if the device is on standby, a small window may appear to post a short notice. Thus, a user may easily know there is something available and then may gaze at the screen or notice window to invoke a presentation or shake the device and then gaze at it to cause info presentation.

For a qualified gaze or look at a display, a user's sight may also fall on things located outside the display but close to its edge, instead of areas on display only. The reason is that, when a user looks at objects close to a display, contents shown on it may also reach the user's eye, thus providing a viewing opportunity anyway. And hopefully, the user may turn his or her sight a bit to get a better reception of the contents. Moreover in many cases, instead of a display of a device, it may be good enough to qualify as a gaze at a display if a user just looks at a direction toward the device, because it means a user may have intention to watch a presentation on it, and the user may have a good chance to notice contents displayed on the device anyway. In cases of smartphone and tablet computer, gazing at a device is almost equivalent to gazing at a display, because for these devices, a display may cover the whole area of one side.

Lastly, a method may be configured which ascertains whether a user faces a device, instead of gazing at a device. In some applications, it may be difficult to sense a user's eye movement, due to technical issues or ambient lighting conditions. Thus it may be arranged to detect whether a user faces a device. For instance, a device may use an imaging sensor like camera to take pictures or videos of a user. Certain algorithm may be used to identify facial features of the user, determine positions of the user's eyes, and then calculate a distance between a spot of the device and one eye and another distance between the spot and the other eye. The spot may be a point at the center of the device or the center of an output component. If difference of the two distances is smaller than a given value, it may be considered that the device is right in front of the user or the user faces the device. Consequently, it may be configured that in all of above discussions, gazing requirement may be replaced by facing requirement when a user or entity decides to do so. For instance, a requirement of gazing at a device may become a requirement of facing a device.

Therefore the scope of the invention should be determined by the appended claims and their legal equivalents, rather than by the examples given.

The invention claimed is:

1. A method performed for executing or implementing a command via an electronic device,
    wherein said electronic device is a portable device, a gadget, a device integrated with another apparatus, or a standalone device, comprising:
    1) receiving at said electronic device a voice input from a user using voice recognition techniques;
    2) ascertaining said voice input using a plurality of sensing techniques, wherein said plurality of sensing techniques includes determining whether said voice input comprises a name of said electronic device and whether said voice input matches a given profile or given conditions;
    3) turning on a gaze-sensing system from an inactive or standby state when it is determined that said voice input matches said given profile or said given conditions;
    4) sensing said user's gaze direction via said gaze-sensing system and determining whether said user looks at a direction toward said electronic device after turning on said gaze-sensing system; and
    5) executing or implementing said command via said electronic device when it is detected that said user looks at a direction toward said electronic device within a given time period after said voice input is received or when said voice input comprises said name.

2. The method according to claim 1 further including turning on said gaze-sensing system in predefined conditions and executing or implementing said command via said electronic device when it is detected that said user looks at a direction toward said electronic device during a time period when said voice input is being received.

3. The method according to claim 1 further including executing or implementing said command via said electronic device when it is detected that said user looks at a direction toward said electronic device and said voice input doesn't include said name.

4. The method according to claim 1 further including turning on said gaze-sensing system before receiving said voice input in predefined conditions and executing or implementing said command when it is detected that said user looks at a direction toward said electronic device before or during the ascertaining step.

5. A method performed for executing or implementing a command via an electronic device,
    wherein said electronic device is a portable device, a gadget, a device integrated with another apparatus, or a standalone device, comprising:
    1) detecting at said electronic device a voice input from a user using voice recognition techniques;
    2) ascertaining said voice input using a plurality of sensing techniques,
    wherein said plurality of sensing techniques includes determining whether said voice input comprises a name of said electronic device and whether said voice input matches a given profile or given conditions;
    3) turning on a gaze sensor from an inactive or standby state after it is determined that said voice input matches said given profile or said given conditions;
    4) sensing said user via said gaze sensor and determining whether said user looks at a direction toward said electronic device after turning on said gaze sensor; and
    5) executing or implementing said command via said electronic device after it is detected that said user looks at a direction toward said electronic device within a given time period after said voice input is received or after it is detected that said voice input comprises said name.

6. The method according to claim 5 further including turning on said gaze sensor in predefined conditions and executing or implementing said command via said electronic device after it is detected that said user looks at a direction toward said electronic device during a time period when said voice input is being received.

7. The method according to claim 5 further including executing or implementing said command via said electronic device after it is detected that said user looks at a direction toward said electronic device and said voice input doesn't include said name.

8. The method according to claim 5 further including turning on said gaze sensor before receiving said voice input in predefined conditions and executing or implementing said command when it is detected that said user looks at a direction toward said electronic device before or during the ascertaining step.

9. An electronic apparatus comprising: one or more processors; and one or more memory devices coupled to said one or more processors, wherein the apparatus is a portable device, a gadget, a device integrated with another apparatus, or a standalone device, said one or more processors operable when executing certain instructions to:
    1) receive at the apparatus a voice input from a user using voice recognition techniques;
    2) ascertain said voice input using a plurality of methods, wherein said plurality of methods includes determining whether said voice input comprises a name of the apparatus and whether said voice input matches a given profile or given conditions;

3) turn on a gaze-sensing system from an inactive or standby state when it is determined that said voice input matches said given profile or said given conditions;
4) sense said user's gaze direction via said gaze-sensing system and determine whether said user looks at a direction toward the apparatus; and
5) execute or implement a command via the apparatus when it is detected that said user looks at a direction toward the apparatus within a given time period after said voice input is received or when said voice input comprises said name.

10. The apparatus according to claim 9 wherein said gaze-sensing system is turned on in predefined conditions and said command is executed or implemented when it is detected that said user looks at a direction toward the apparatus during a time period when said voice input is being received.

11. The apparatus according to claim 9, wherein said command is executed or implemented when it is detected that said user looks at a direction toward the apparatus and said voice input doesn't include said name.

12. The apparatus according to claim 9, wherein said gaze-sensing system is turned on before receiving said voice input in predefined conditions and said command is executed or implemented when it is detected that said user looks at a direction toward the apparatus before or during the ascertaining step.

* * * * *